Patented Feb. 7, 1950

2,496,651

UNITED STATES PATENT OFFICE 2,496,651

ESTERS OF HYDROXYALKYL AROMATIC SULFONAMIDES

David Aelony, Minneapolis, Minn., assignor to General Mills, Inc., a corporation of Delaware No Drawing. Application May 15, 1947, Serial No. 748,335

7 Claims. (Cl. 260—401)

The present invention relates to esters of hydroxyalkyl aromatic sulfonamides. Members of this group of compounds are useful as plasticizers, waxes, and the like. The present application is a continuation-in-part of my copending application, Serial No. 643,748, filed January 26, 1946, entitled Esters of hydroxyalkyd aromatic sulfonamides.

In general, the compounds contemplated by the present invention may be represented by the following structural formula:

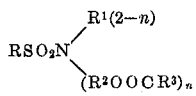

in which R is an aromatic radical such as phenyl, toluyl, xylyl, naphthyl, thienyl, or derivatives thereof; $R^1$ may be hydrogen, an aliphatic hydrocarbon radical such as methyl, ethyl, propyl, and the like, aryl such as phenyl, toluyl, xylyl, and the like; $R^2$ is alkylene such as methylene, ethylene, propylene, and the like; and $R^3$ is an aliphatic hydrocarbon radical such as methyl, ethyl, propyl, heptyl, nonyl, pentadecyl, heptadecyl, and the like. The letter $n$ may represent the integers one or two.

The lower esters, such as the acetates, butyrates, crotonates, and the like, are liquids which have been found to be useful as plasticizers for polyvinyl resins, particularly polyvinyl chloride resins. Polyvinyl resins are generally too hard and rigid to be used for many purposes without a plasticizer. It is usually necessary to add a plasticizer to make the resin soft and pliable and capable of being milled into strong pliable sheets or films. It is also necessary that the plasticized resin composition have excellent heat stability, suppleness and elasticity. In order for a material to act as a plasticizer, it is necessary that it be compatible with the resin and not exude or sweat out to leave the resin unplasticized.

There have been found very few plasticizers which are really satisfactory for this purpose. The esters of dibasic acids, such as phthalic and sebacic acid, have been most widely used for plasticizing such resins. However, unless the esters are derived from alcohols of fairly high molecular weight, such as octyl alcohol, the plasticizers are of too low a molecular weight, and therefore too volatile for many uses. The plasticizers which are sufficiently non-volatile and which also have the ability to give flexibility at low temperature and some measure of stability against heat discoloration, are quite limited in number. Furthermore, the heat stability of such compounds is generally not particularly satisfactory.

The lower esters herein described are, in general, highly satisfactory as plasticizers for resins in general, and particularly for the polyvinyl resins. They exhibit good compatibility, elongation, thermal stability, color, and "hand" or "feel." At the same time, they render the plastics flexible at low temperature. Moreover, the plasticizers are of a high boiling point and consequently are not lost through volatilization during use.

The higher fatty acid esters of these sulfonamides in general are useful as waxes. Compounds which are useful as waxes in general should be relatively inert chemically, should be light in color, non-crystalline, and melt at an elevated temperature, for example at 60–100° C. They should also form gels in solvents, emulsify to form liquid polishes, and produce a good hard shiny surface which will not mar easily. Waxes heretofore available have not been completely satisfactory in various respects. Either they are too high in cost or lack the necessary properties of good waxes. The wax compounds of the present invention constitute improvements on the compounds which have been available heretofore.

The various compounds of the present invention may be prepared by reacting an aromatic sulfonyl halide with an alkanolamine to form the hydroxyalkyl aromatic sulfonamide which may then be treated with an acylating agent to form the ester. It will be apparent that the alkanolamine may be a mono- or dialkanolamine, and in the event that a dialkanolamine is employed, it will be apparent that this may subsequently be partially or completely esterified. The reaction conditions which are suitable are illustrated by the following examples.

EXAMPLE 1

*N,N-di-beta-hydroxyethyl benzene sulfonamide distearate*

202 g. benzene sulfonchloride were slowly added to an agitated cold solution of 65 g. sodium carbonate and 150 g. diethanolamine in 400 cc. of water. The resultant mixture gradually came to a boil and was refluxed for 1 hour, whereupon it was allowed to stand and was separated into two layers. The lower layer was extracted with chloroform, washed with a little cold water, dried over $Na_2SO_4$, filtered and evaporated in vacuo on a steam bath. 238 g. of a heavy liquid $N_D^{30}$ 1.5457 were obtained. The percent N found was 5.60 (theory for N,N-di-beta-hydroxyethyl benzene sulfonamide, 5.71); hydroxyl number found was 420.7 (theory 458); percent free amino group, less than 0.4%.

165 g. of a commercial stearic acid (Neo fat 1-65), 73.5 g. N,N-di-beta-hydroxyethyl benzene sulfonamide, 300 cc. xylene and 5 g. p-toluene sulfonic acid hydrate were agitated and refluxed over a Starck and Dean tube. In five hours, 11 cc. of water (theory for the distearate, 12.5 cc.) were collected in the trap. The product was dried in vacuo on a steam bath yielding 220 g. of a solid M. P. 75–6° C., percent N found 1.74 (theory 1.81), acid No. 13.5. Wax gels containing 25% solids and 75% solvent were made using turpentine and also with mineral spirits. These wax gels imparted beautiful polishes to shoes, furniture, and cars.

EXAMPLE 2

*N-beta-hydroxyethyl benzene sulfonamide stearate*

40 g. monoethanolamine and 53 g. sodium carbonate were dissolved in 300 cc. H2O, and 113 g. of benzene sulfonchloride were then added slowly. The mixture was heated on a steam bath and agitated occasionally for four hours, at which time two layers were formed on standing. The lower layer was extracted with chloroform and the chloroform solution was dried over sodium sulfate, filtered, and evaporated in vacuo yielding 123 g. (93% theory) of a viscous liquid which upon fractionation in vacuo yielded 106 g. liquid of pale straw color, $N_D^{30}$ 1.5515, percent N found 6.97 (theory for N-beta-hydroxyethyl benzene sulfonamide, 6.96); hydroxyl number found 555.5 (theory 556); boiling point 172° C. at 40 microns pressure.

100 g. N-beta-hydroxyethyl benzene sulfonamide, 140 g. of a commercial stearic acid (Neo fat 1–65), 2.5 g. p-toluene sulfonic acid monohydrate and 400 cc. xylene were agitated and refluxed over a Starck and Dean tube. In 2½ hours the reaction was complete, and nearly 9 cc. water was collected. Xylene was removed by distillation in vacuo. The residue was poured into dilute ammonium hydroxide solution; then acidified with HCl, filtered, washed with water until neutral, then with a little alcohol and allowed to dry. It was recrystallized twice from alcohol yielding 71% of a material M. P. 79–79.5° C., percent N found 2.97 (theory for the stearate, 3.02); acid number 4.7. The product yielded a softish gel with 75% turpentine, but a very firm one with 75% mineral spirits. Excellent shines on shoes, furniture, and cars were obtained with each.

EXAMPLE 3

*N-beta-hydroxyethyl p-toluene sulfonamide stearate*

250 g. monoethanolamine were dissolved in 1 liter of water. 381 g. p-toluene sulfonchloride were added with agitation. The temperature went up to 65° C. The reaction mixture was brought up to a boil and was allowed to stand overnight. The lower layer was dissolved in chloroform, washed with a little cold water, dried over sodium sulfate, filtered and evaporated. It was distilled in vacuo yielding 357 g. material, boiling point 208° C. at 40 microns pressure. Two days after distillation it solidified.

134 g. N-beta-hydroxyethyl p-toluene sulfonamide, 175 g. of a commercial stearic acid (Neo fat 1–65) and 200 cc. xylene were agitated and refluxed under a Starck and Dean tube for 3½ hours. The temperature was allowed to go up to 230° C. by gradually draining the distillate. 11.5 cc. water were collected (theory for the stearate, 11.2 cc.). The solvent was stripped in vacuo. The product, a dark brown solid of buttery consistency was obtained in a 295 g. yield (theory 298 g.), percent N found 2.89 (theory 2.97). The product was extremely soluble in most ordinary organic solvents such as benzene, alcohol, carbon tetrachloride, etc., with the exception of aliphatic hydrocarbons.

EXAMPLE 4

*N,N-di-beta-hyroxyethyl p-toluene sulfonamide distearate*

210 g. diethanolamine were dissolved in 700 cc. water and the mixture was heated to 70° C. 190.5 g. p-toluene sulfonchloride were added at once. A violent reaction accompanied by boiling took place, and a homogeneous solution resulted. On cooling, a dark lower layer separated which solidified at 45° C. It was filtered and recrystallized from methanol yielding 156 g. white crystals M. P. 101.5–103.5° C. and 42 g. white powder (from mother liquor) M. P. 97.5–100° C. The total yield was 76.5% theory.

129.5 g. N,N-di-beta-hydroxyethyl p-toluene sulfonamide, 280.5 g. of a commercial stearic acid (Neo fat 1–65), 1 g. p-toluene sulfonic acid monohydrate and 250 cc. xylene were refluxed over a Starck and Dean tube for two hours. A total of 18 cc. of water was collected in the trap. The product was poured into 1.5 liters butanol, was allowed to stand overnight and filtered. After five days of air drying 353.5 g. of the product (92% yield) M. P. 68.5–69.5° C. were obtained. Percent N found 1.765 (theory for the stearate, 1.78), acid number 2.4. When melted and allowed to solidify, a beautiful hard shiny solid is formed (penetration in 30 sec. with a 200 g. load, ASTM needle, was 3, while it was 1 for Carnauba No. 1). Fine 25% wax gels were made using turpentine or mineral spirits as solvents. The gels possess excellent polishing properties.

EXAMPLE 5

*N,N-di-beta-hydroxyethyl p-toluene sulfonamide diacetate*

55 g. N,N-di-beta-hydroxyethyl p-toluene sulfonamide and 55 g. acetic anhydride were warmed up under reflux. There was a very vigorous reaction which soon subsided. Refluxing was continued 3½ hours. The reaction mixture was then refluxed a few minutes with dilute sodium carbonate solution, cooled and extracted with ether. The ether extract was washed with water, dried over sodium sulfate, filtered and evaporated yielding 64 g. of a liquid $N_D^{30}$ 1.5103; saponification equivalent found 177.7 (theory for the diacetate 176.5); percent N found 4.02 (theory 3.97).

EXAMPLE 6

*N,N-di-beta-hydroxyethyl p-toluene sulfonamide dibutyrate*

100 g. N,N-di-beta-hydroxyethyl p-toluene sulfonamide, 70 g. n-butyric acid, 250 cc. xylene and 0.5 g. of p-toluene sulfonic acid hydrate were agitated and refluxed over a Starck and Dean tube for 4½ hours. 14 cc. of water were collected (theoretical). Xylene was distilled off and the residue was distilled in vacuo with slight decomposition. 118 g. distilled at 238° C. at 0.4 mm., $N_D^{30}$ 1.5002; per cent N found 3.52 (theory 3.51).

EXAMPLE 7

*N,N-di-beta-hydroxyethyl beta-naphthalene sulfonamide distearate*

100 g. beta-naphthalene sulfonchloride, 110 g. diethanolamine, and 300 cc. water were stirred two hours on a steam bath. The cooled product was filtered and recrystallized from methanol yielding 77 g., M. P. 92–4° C.; 9 g., M. P. 82–6° C. and 46 g. material of buttery consistency obtained by evaporation of mother liquor.

70.5 g. N,N-di-beta-hydroxyethyl beta-naphthalene sulfonamide, 134 g. of a commercial stearic acid (Neo fat 1-65), 1 g. toluene sulfonic acid monohydrate and 300 cc. of xylene were agitated and refluxed over a Starck and Dean tube for two hours. 8.5 cc. water were collected. The product was recrystallized from butanol and then from methanol yielding 153 g. wax, M. P. 78.5–80° C. Wax gels prepared from the wax had good polishing properties.

EXAMPLE 8

N-ethyl, N-hydroxyethyl benzene sulfonamide acetate

N-ethyl, N-hydroxyethyl benzene sulfonamide acetate was prepared by refluxing 100 g. N-ethyl, N-hydroxyethyl benzene sulfonamide with 95 cc. acetic anhydride for 3½ hours. It was fractionated, yielding 113 g. white liquid, boiling point at 150 microns of 184° C., $N_D^{30}$ 1.5133, and 5 g. residue. The yield was nearly theoretical. Sap. Eq. 277.3; 277.8 (theory 271); percent N 5.10 (theory 5.16).

EXAMPLE 9

N-ethyl, N-hydroxyethyl benzene sulfonamide butyrate

N-ethyl, N-hydroxyethyl benzene sulfonamide butyrate was prepared by refluxing 76 g. N-ethyl, N-hydroxyethyl benzene sulfonamide and 84 cc. butyric anhydride for 4 hours. It was fractionated in vacuo yielding:

Fraction #1—B. P. at 100 microns of <177° C., 5.5 g., $N_D^{25}$ 1.4987.
Fraction #2—B. P. at 100 microns of 180° C., 83.0 g., $N_D^{25}$ 1.5080.
Fraction #2 was 83% theory. Sap. Eq. 312 (theory 299), percent N 4.68 (theory 4.68).

EXAMPLE 10

N-ethyl, N-hydroxyethyl benzene sulfonamide caprylate

N-ethyl, N-hydroxyethyl benzene sulfonamide caprylate was prepared by refluxing and agitating under a Starck and Dean tube 72 g. caprylic acid (Neo fat #7), 114.5 g. N-ethyl, N-hydroxyethyl benzene sulfonamide, 5 g. p-toluene sulfonic acid hydrate and 300 cc. xylene for 5 hours. The product was washed with $Na_2CO_3$, $H_2O$, dried over $Na_2SO_4$, filtered, evaporated and distilled. First fraction with boiling point at 20 microns below 165° C. was discarded. The second fraction had the following properties: boiling point at 40 microns of 177–182° C., $N_D^{25}$ 1.4987, saponification equivalent 428.7, 428.5 (theory 355).

EXAMPLE 11

N-ethyl, N-hydroxyethyl benzene sulfonamide caprate

N-ethyl, N-hydroxyethyl benzene sulfonamide caprate was prepared in an 84% yield when 114.5 g. (½ mol) N-ethyl, N-hydroxyethyl benzene sulfonamide, 86 g. capric acid (Neo fat 15), 5 g. toluene sulfonic acid hydrate and 300 cc. xylene were refluxed and agitated for 75 minutes. 85.5% theoretical $H_2O$ distilled in 45 minutes. Despite additional catalyst, no more $H_2O$ (outside that in the catalyst) distilled in 75 minutes. The product was washed with $H_2O$, $NH_4OH$, $H_2O$, dried, filtered, evaporated, and distilled. First fraction, boiling point at 120 microns of 171–190° C., 9 g., $N_D^{25}$ 1.5173, percent N 4.73; second fraction, 160 g., boiling point at 200 microns of 225° C., $N_D^{25}$ 1.4964 (84% theory), acid No. 0.33, Sap. Eq. 393.3, 393.6 (theory 383), percent N 3.67 (theory 3.65), residue 6 g.

EXAMPLE 12

N-ethyl, N-hydroxyethyl benzene sulfonamide laurate

N-ethyl, N-hydroxyethyl benzene sulfonamide laurate was prepared by dissolving 80 g. lauroyl chloride in 100 cc. benzene and adding it slowly to a solution of 84 g. N-ethyl, N-hydroxyethyl benzene sulfonamide and 40 g. pyridine in 200 cc. benzene. The mixture was refluxed 3 hours, washed with $H_2O$, diluted with HCl, and $H_2O$ until neutral. It was dried over $Na_2SO_4$, filtered, evaporated, and fractionated through a 1 foot column. The following fractions were obtained:

(1) B. P. at 12–60 microns of 112–155° C., 59 g., semi-solid at room temperature.
(2) B. P. at 25 microns of 140–160° C., 17 g.
(3) B. P. at 40 microns of 140–170° C., 18 g.
(4) B. P. at 30 microns of 215–220° C., 41 g., $N_D^{25}$ 1.4918, acid No. 3.4, Sap. Eq. 416.7, 415.8 (theory 411).

EXAMPLE 13

N-ethyl, N-hydroxyethyl benzene sulfonamide myristate

N-ethyl, N-hydroxyethyl benzene sulfonamide myristate was prepared in 87.9% yield by refluxing 113 g. myristic acid (Neo fat 13), 114.5 g. N-ethyl, N-hydroxyethyl benzene sulfonamide, 5 g. p-toluene sulfonic acid hydrate and 300 cc. xylene for 2½ hours. 95.5% theoretical $H_2O$ was collected. It was washed with $H_2O$, $NH_4OH$ (emulsion). The emulsion was broken with alcohol. The xylene solution was dried, filtered, evaporated, and distilled. Fraction #1, boiling point at 40 microns of 225° C., 17 g., $N_D^{24}$ 1.4935, Sap. Eq. 466, percent N 3.00; fraction #2, 192 g., boiling point at 50 microns of 240° C., $N_D^{24}$ 1.4915, Sap. Eq. 443 (theory 439), percent N 3.14 (theory 3.18).

EXAMPLE 14

N-ethyl, N-hydroxyethyl benzene sulfonamide stearate

N-ethyl, N-hydroxyethyl benzene sulfonamide stearate was prepared in a 94% yield after 3 hours of refluxing 190 g. N-ethyl, N-hydroxyethyl benzene sulfonamide, 233 g. commercial stearic acid (Neo fat 1-65), 5 g. toluene sulfonic acid hydrate, and 700 cc. xylene. The product is a brown, buttery solid which can be distilled (boiling point at 40 microns of 242° C.). Acid number of undistilled solid 4.6, 4.1; percent N 2.84.

EXAMPLE 15

N-butyl, N-hydroxyethyl benzene sulfonamide acetate

N, n-butyl, N, beta-hydroxyethyl benzene sulfonamide acetate was prepared by refluxing for two hours 46 g. recovered N-butyl, N-hydroxyethyl benzene sulfonamide with 100 cc. acetic anhydride. Acetic acid and anhydride were removed by distillation in vacuo (water pump) and the residue was distilled in high vacuo yielding 42 g. of a straw-colored liquid, boiling point at 8 microns of 153–4° C., $N_D^{30}$ 1.5075, percent N found 4.58 (theory 4.68).

EXAMPLE 16

*N-butyl, N-hydroxyethyl benzene sulfonamide butyrate*

An 83.5% yield of N-butyl, N-hydroxyethyl benzene sulfonamide butyrate was obtained by adding 45 g. n-butyryl chloride at once to a solution of 100 g. N-hydroxyethyl, N-butyl benzene sulfonamide and 25 cc. pyridine in 300 cc. benzol. It was refluxed 3 hours, cooled and filtered. The filtrate was washed with $H_2O$, NaOH, $H_2O$. It was dried over $Na_2SO_4$, filtered, evaporated and distilled in vacuo, yielding 106 g., boiling point at 10–30 microns of 155–170° C., $N_D^{25}$ 1.5025, hydroxyl number 0, saponification equivalent 329.6, 329.7 (theory 327), percent N 4.24, 4.27 (theory 4.28).

EXAMPLE 17

*N-butyl, N-hydroxyethyl benzene sulfonamide caprylate*

N-butyl, N-hydroxyethyl benzene sulfonamide caprylate was prepared by refluxing and agitating 66.2 g. caprylic acid, 118 g. N-butyl, N-hydroxyethyl benzene sulfonamide, 5 g. p-toluene sulfonic acid hydrate and 300 cc. xylene for 5 hours. The product was washed with 10 g. $Na_2CO_3$, $H_2O$, dried over $Na_2SO_4$, filtered, evaporated and distilled in vacuo, yielding a product with boiling point at 10 microns of 184–192° C., $N_D^{25}$ 1.4945, percent N 3.73, 3.71 (theory 3.65), saponification equivalent 394, 396 (theory 383).

EXAMPLE 18

*N-butyl, N-hydroxyethyl benzene sulfonamide caprate*

N-butyl, N-hydroxyethyl benzene sulfonamide caprate was prepared in a 94% yield (based on distillate alone) by refluxing for 3 hours 129 g. N-butyl, N-hydroxyethyl benzene sulfonamide, 86 g. (½ mol) capric acid (Neo fat 15), 5 g. p-toluene sulfonic acid hydrate and 300 cc. xylene. The reaction was almost complete in 1 hour (96.6%). The product was washed with $H_2O$, dried over $Na_2SO_4$, filtered and distilled. Fraction No. 1, boiling point at 40 microns of 220° C., 31 g., $N_D^{25}$ 1.4925; fraction No. 2, boiling point at 30 microns of 209–211° C., 162 g., $N_D^{25}$ 1.4927, residue 5 g.

EXAMPLE 19

*N,N-dihydroxyethyl p-toluene sulfonamide diacetate*

N,N-dihydroxyethyl p-toluene sulfonamide diacetate was prepared in an 88% yield by refluxing 55 g. N,N-dihydroxyethyl p-toluene sulfonamide and 55 g. acetic anhydride for 3½ hours. 100 cc. water was added, refluxed for a few minutes, made alkaline with $Na_2CO_3$ and extracted with ether. The ether extract was washed, dried, filtered, and evaporated, yielding 64 g. of a liquid, $N_D^{30}$ 1.5103, saponification equivalent was 177.7 (theory 176.5), percent N 4.025 (theory 3.97).

EXAMPLE 20

*N,N-dihydroxyethyl p-toluene sulfonamide dicrotonate*

N,N-dihydroxyethyl p-toluene sulfonamide dicrotonate was prepared in an 82% yield by refluxing 259 grams N,N-dihydroxyethyl p-toluene sulfonamide, 250 grams commercial crotonic acid, 10 grams p-toluene sulfonic acid and 500 cc. xylene for 7.5 hours over a Starck and Dean tube. After washing, drying, and evaporating, the product was distilled in vacuo yielding a tea-colored liquid $N_D^{30}$ 1.5232, percent N 3.73, 3.63 (theory 3.54), acid number 2.02, Sap. Eq. 206.4, 207.8 (theory 197.5), specific gravity 1.1966.

EXAMPLE 21

*N,N-dihydroxyethyl p-dichlorbenzenesulfonamide diacetate*

142 g. of p-chlorbenzenesulfonchloride was added over a 20 minute period to a stirred boiling solution of 76 g. of diethanolamine, 72 g. of sodium carbonate, and 1 liter of water. The mixture was agitated and refluxed for 6 hours, after which it was neutralized with 37 g. sulfuric acid dissolved in 100 cc. of water. The resultant mixture was cooled and filtered. The precipitate was extracted with methanol and the hot methanol solution was cooled and filtered. The precipitate weighed 13 g. The mother liquor was evaporated yielding 125 g. of a white solid.

70 g. N,N-dihydroxyethyl chlorbenzene sulfonamide was converted in 76% yield to the diacetate by refluxing it with 100 cc. acetic anhydride for three hours. It was filtered hot and fractionated yielding 69 g. low melting solid, boiling point at 12 microns of 185–193° C., saponification equivalent 194.6 (theory 182.8), per cent N 3.92 (theory 3.85).

EXAMPLE 22

*N,N-dihydroxyethyl p-dichlorbenzenesulfonamide dicaprylate*

37 g. N,N-dihydroxyethyl p-dichlorbenzenesulfonamide, 34 g. caprylic acid (Neo fat 7), 2 g. p-toluene sulfonic acid hydrate, and 250 cc. xylene were agitated and refluxed over a Starck and Dean tube. Theoretical water distilled in 3 hours. The product was allowed to cool. It was washed with $Na_2CO_3$, $H_2O$, dried over $Na_2SO_4$, evaporated, and distilled in vacuo. Only a few cc. distilled over below 205° C. at 20 microns. At 227–232° C. at 10 microns 48 g. of liquid distilled over. This liquid had a $N_D^{25}$ 1.5035, Sap. Eq. 278.6 (theory 283).

EXAMPLE 23

*N,N-dihydroxyethyl thiophene sulfonamide diacetate*

N,N-dihydroxyethyl thiophene sulfonamide diacetate was prepared by refluxing 100 g. N,N-dihydroxyethyl thiophene sulfonamide and 200 cc. acetic anhydride for 4 hours. The product was evaporated and distilled in vacuo:

| | |
|---|---|
| Fraction #1—B. P. at 50 microns of <188° C. | 12 g., $N_D^{30}$ 1.5425 |
| Fraction #2—B. P. at 50–70 microns of 192–205° C. | 88 g., $N_D^{30}$ 1.5153 |
| Residue | 10 g. |
| Sap. Eq. (theory 167.5) | Per cent N (theory 4.18) |
| Fraction #1—239.3; 238.9 | 3.82; 3.77; 3.82 |
| Fraction #2—176.9; 177.3 | 4.24; 4.24 |

EXAMPLE 24

*N-hydroxyethyl, N-phenyl benzene sulfonamide acetate*

N-benzenesulfonyl, N-phenyl ethanolamine acetate was prepared in a 93% yield by refluxing 70 g. N-phenyl, N-benzenesulfonyl ethanolamine and 80 cc. acetic anhydride for 5 hours. It was allowed to stand overnight. The acid and the anhydride were distilled off first. The residue was then distilled at 185–188° C. at 30 microns. It weighed 75 g., $N_D^{25}$ 1.5570, per cent N 4.32, 4.30 (theory 4.39).

The esters of N-alkyl, N-hydroxyethyl benzene sulfonamides prove particularly desirable as plasticizers for polyvinyl resins. This is demonstrated by the table given below which shows the properties of polyvinyl resins plasticized with these particular compounds. The plasticized compositions were prepared as follows: 63.5 g. Vinylite VYNW (Carbide & Carbon), 0.5 g. stearic acid, 1 g. basic lead carbonate, 35 g. plasticizer, are mixed and milled on a heated roller mill at 140–150° C. The results of these tests are indicated as follows:

*Esters of N-ethyl, N-hydroxyethyl benzene sulfonamide*

| Ester | Sweating in 24 hrs. | Elongation | Heat stability at 160° C. | Min. Flex |
|---|---|---|---|---|
| | | Percent | Hours | ° C. |
| Acetate | No | 100.3 | 2¼ | −6 |
| Butyrate | No | 123.8 | ¾ | −9 |
| Caprylate | No | 115.1 | 1 | −12 |
| Caprate | No | 105.0 | 3 | −16 |
| Laurate | No | 103.5 | 1 | −19 |
| Myristate | No | 83.0 | 2¾ | −20 |
| Stearate | Very slight | 67.6 | ½ | −6 |
| Oleate | No | 73.0 | ½ | −18 |

*Esters of N-butyl, N-hydroxyethyl benzene sulfonamide*

| Ester | Sweating in 24 hrs. | Elongation | Heat stability at 160° C. | Min. Flex |
|---|---|---|---|---|
| | | Percent | Hours | ° C. |
| Acetate | No | 114.0 | ½ | −7 |
| Butyrate | No | 108.5 | 1¼ | −9 |
| Caprylate | No | 111.0 | 1 | −14 |
| Caprate | No | 95.0 | 1¼ | −13 |

While various modifications of the above invention have been described, it is to be understood that this invention is not limited thereto, but may be varied within the scope of the following claims.

I claim as my invention:

1. An ester of a hydoxyalkyl aromatic sulfonamide having the following structural formula:

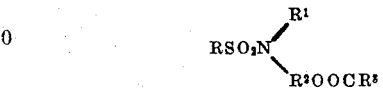

in which R is an aromatic nucleus, $R^1$ is alkyl, $R^2$ is a short chain alkylene group, and the group $R^3CO$ is the acyl group of a higher fatty acid.

2. A compound according to claim 1 in which $R^1$ is ethyl.

3. A compound according to claim 1 in which $R^2$ is ethylene.

4. A fatty acid ester of N-alkyl, N-hydroxyethyl benzene sulfonamide, the fatty acid group of the ester being a higher fatty acid group.

5. An ester of N-ethyl, N-hydroxyethyl benzene sulfonamide, said ester containing a fatty acid group containing at least 8 carbon atoms.

6. An ester of N-butyl, N-hydroxyethyl benzene sulfonamide, said ester containing a fatty acid group containing at least 8 carbon atoms.

7. N-ethyl, N-hydroxyethyl benzene sulfonamide monolaurate.

DAVID AELONY.

REFERENCES CITED

The following references are of record in the file of this patent:

UNITED STATES PATENTS

| Number | Name | Date |
|---|---|---|
| 2,036,932 | Felix et al. | Apr. 7, 1936 |
| 2,097,414 | Kharasch et al. | Oct. 26, 1937 |
| 2,187,823 | Ulrich et al. | Jan. 23, 1940 |